United States Patent [19]
Saito

[11] 3,855,968
[45] Dec. 24, 1974

[54] APPARATUS FOR DEPOSITING A POWDERED SUBSTANCE ON THE INTERIOR SURFACE OF AN INFLATABLE TUBE

[75] Inventor: Shiro Saito, Tokyo, Japan

[73] Assignee: Nikka Kabushiki Kaisha, Tokyo, Japan

[22] Filed: Dec. 21, 1973

[21] Appl. No.: 427,047

[52] U.S. Cl................. 118/308, 118/312, 118/317, 118/326
[51] Int. Cl............................................. B05b 7/00
[58] Field of Search ........... 118/308, 312, 317, 326, 118/602; 117/18, 19

[56] References Cited
UNITED STATES PATENTS

| | | | |
|---|---|---|---|
| 2,565,455 | 8/1951 | Miller | 118/308 |
| 2,770,212 | 11/1956 | Marantz | 118/312 |
| 3,028,834 | 4/1962 | Klein et al. | 118/326 |
| 3,696,780 | 10/1972 | Fritzsche | 118/69 |
| 3,714,926 | 2/1973 | Ofner | 118/312 |

Primary Examiner—Mervin Stein
Assistant Examiner—Douglas A. Salser

[57] ABSTRACT

An apparatus for uniformly depositing a finely powdered substance in a thin layer on the interior surface of an inflatable tube, which is maintained in its inflated shape by an upwardly moving air pressure method, by diffusing said powdered substance into the inflated tube with a constant air pressure within said tube. The apparatus comprises a blower and conduits and forms a closed circulation passage of the powdered substance through conduits, the inside of the inflated tube, and the blower.

7 Claims, 2 Drawing Figures

APPARATUS FOR DEPOSITING A POWDERED SUBSTANCE ON THE INTERIOR SURFACE OF AN INFLATABLE TUBE

BACKGROUND OF THE INVENTION

The present invention relates to an apparatus for uniformly depositing a powdered substance on an interior surface of an inflatable tube which is maintained in its inflated shape by upwardly moving air pressure.

In a conventional apparatus of the type disclosed herein, an air feeding line into the inflation tube and an air exhaust line from the inflation tube are separately arranged. Accordingly, it has been very difficult to keep the air pressure constant in the inflated tube while feeding powdered substance into the tube with the infeed air stream. This often results in deformity and irregularity of the shape of the inflated tube and irregularity of deposition of the powdered substance onto the interior surface of the tube.

Furthermore, in the conventional apparatus, the unused powdered substance entrained in the exhaust air had to be caught in a special device, which made the apparatus complicated.

BRIEF SUMMARY OF THE INVENTION

According to the present invention, there is provided an apparatus for depositing a powdered substance on an interior surface of an inflated tube, wherein first and second conduit means are provided each of which has one end thereof opening into the tube, and the other ends thereof communicating with each other through a blower. Means are also provided for supplying a powdered substance into one of the conduit means for delivery to the tube.

Air is delivered through a first valve means to initially inflate the tube, then the first valve means is closed and a second valve means, which is located between the open end of the second conduit means and the blower, is then opened, whereupon a closed circulation passage is formed for the powdered substance through the blower and first conduit means, then the inside of the inflated tube, and through the second conduit means back to the blower.

Thus, the principal object of the present invention is to provide an apparatus for depositing a powdered substance on the interior surface of an inflated tube wherein the inner pressure of the tube is maintained constant during deposition of the substance.

Another object of the present invention is to provide an apparatus of the type defined above which is simple in structure and operation.

The aforementioned and additional objects and features of the present invention will become more clearly apparent from the detailed description thereof, which is to be read with reference to the accompanying drawings, in which:

FIG. 1 is a diagrammatic view simply showing the preferred embodiment of the apparatus according to the present invention; and FIG. 2 is a perspective schematic illustration partly in section showing in more detail the embodiment of the apparatus shown in FIG. 1.

DETAILED DESCRIPTION OF THE PREFERRED EMBODIMENT

Figure 1:
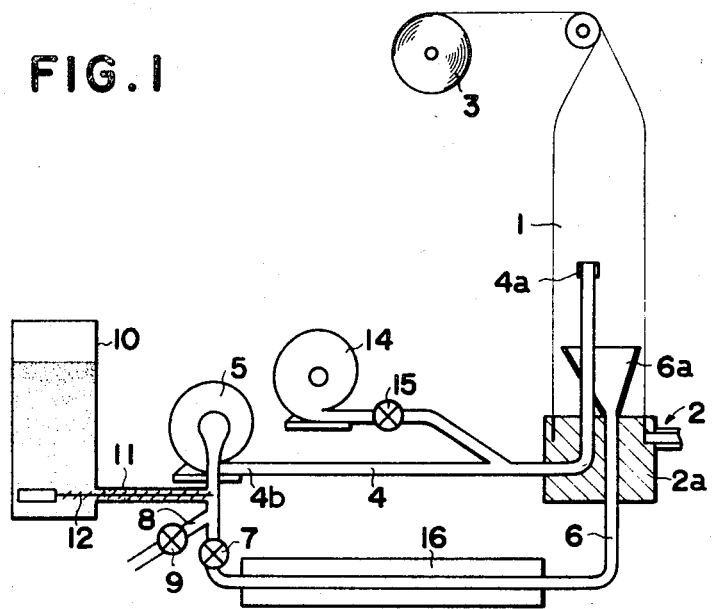
Figure 2:
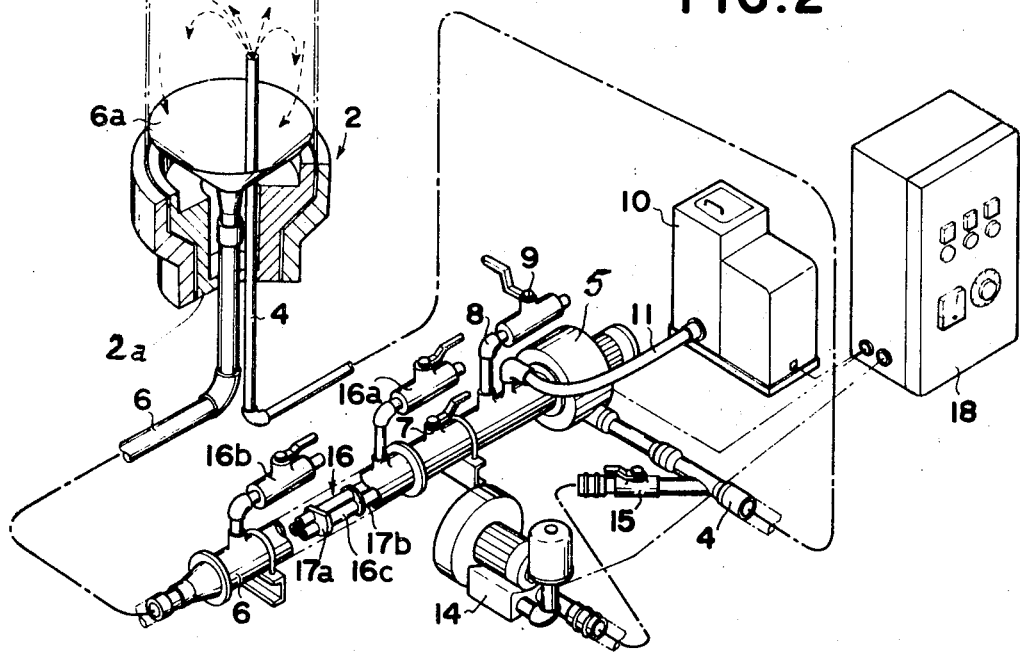

In FIGS. 1 and 2 an inflatable tube 1 is shown inflated and formed by the tube forming device 2. The material from which the tube is formed is drawn from a roll 3. A first conduit 4 is provided so that one end 4a thereof is disposed within the inflated tube 1 through a base portion 2a of the forming device 2, and the other end 4b thereof is connected to the outlet of a blower 5. Within the tube 1 is also disposed a second conduit 6 having a funnel-shaped member 6a at the end thereof. The second conduit 6 is connected to an inlet of the blower 5 and has a valve 7 and an air inlet passage 8 having a valve 9 therein. The air inlet 8 is disposed between the valve 7 of the second conduit 6 and the blower 5. Near the blower 5 is provided a vessel 10 containing therein the desired powdered substance so that the vessel 10 can supply the powdered substance to the blower 5 by way of flexible tube 11, which includes therein a flexible conveyor means 12 such as a chain or screws. In addition, there may be provided a supplemental blower 14 which is connected through a valve 15 to the first conduit 4 if it is desired to feed air to the tube more rapidly, and a device 16 for cooling the air in the second conduit 6. Both the additional blower 14 and the cooling device 16 may be used but are not necessary as far as the concept of the present invention is concerned.

The cooling device 16 in this embodiment has an inlet 16a for cooled water, an outlet 16b, and a plurality of cooling conduits 16c so that the cooled water supplied from the inlet 16a travels through the cooling conduits 16c and passes outwardly through the outlet 16b. The cooling conduits 16c are grouped together and supported by suitable means, such as the discs 17a and 17b within the second conduit 6. The support members 17a and 17b have a substantially semi-circular shape and are fixed within the conduit 6 so that the air from the funnel-shaped member 6a travels above the member 17a and below the guide member 17b to effectively cool the air travelling toward the blower 5 through the second conduit 6.

The apparatus of the present invention will be described further with respect to an operation thereof. At first, the valve 7 of the second conduit 6 is closed and the valve 9 of the air inlet 8 is opened. Then, the blower 5 is operated by a power source 18 to deliver a predetermined amount of air into the inflatable tube 1 for as long and as much as may be necessary to expand the tube 1 to a desirable shape. After the inflated tube 1 is expanded by the air from the blower 5, the valve 9 of the air inlet 8 is closed and the valve 7 of the second conduit 6 is opened simultaneously to form a "closed loop" of air circulation. The air supplied from the air inlet 8 travels through the first conduit 4 and returns to the blower 5 through the second conduit 6. In this sense, the air circulation forms a "closed loop."

After the two different valves 7 and 9 are opened and closed, respectively, as described, the powdered substance in the vessel 10 is delivered through the flexible tube 11 to the blower 5 by driving the conveyor 12. The blower 5 blows the powdered substance by way of the first conduit 4 to the inflated tube 1 which is formed by the forming device 2. The powdered substance is diffused within the tube 1 and particles of the powdered substance are deposited on an interior surface of the inflated tube. During the diffusing operation of the powdered substance, the air pressure in the inflated tube 1 is kept constant by reason of the construction which provides a "closed loop" of the conduits 4 and 6, the inside of the inflated tube 1, and the blower 5.

Among the particles of the powdered substance diffused within the inflation tube 1, some particles will fail to be deposited and to adhere to the interior surface of the inflated tube, and these particles will fall down to the funnel-shaped member 6*a* of the second conduit 6. The particles which thus fall into the funnel-shaped member 6*a* are drawn and delivered to the blower 5 through the second conduit 6 and mixed with additional powdered substance newly supplied from the vessel 10 to be delivered again to the inflated tube 1. As described above, the powdered substance is continuously delivered to the inflated tube so that the particles thereof are diffused onto the interior surface of the tube.

According to the present invention, since the air pressure within the inflation tube can be maintained constant during the depositing operation, uniform deposition of the powdered substance can be attained and the desired shape of inflated tube can be obtained.

Furthermore, since the powdered substance which fails to adhere to the interior surface of the inflated tube is recirculated, there is no need for a special device for catching it.

Although the present invention has been described with reference to the preferred embodiment thereof, many modifications and alterations may be made within the spirit of the present invention.

What is claimed is:

1. Apparatus for depositing a powdered substance on the interior surface of an inflated tube comprising a. first conduit means having one end thereof opened into said tube, b. second conduit means also having one end thereof opened into said tube, c. a blower to which the other ends of said conduit means are connected for communication therebetween, d. air feeding means, including a first valve means, for delivering air to said tube for inflating said tube when said first valve means is open, e. a second valve means downstream of said air feeding means, said second valve means being closed when said first valve means is open, and adapted to be opened when said first valve means is closed, thereby to provide a continuous closed path of air circulation through said first conduit means, the inside of said tube, said second conduit means, and said blower, f. means for supplying a powdered substance to one of said conduit means for delivery to the inside of said tube through said first conduit means, and g. means for directing any undeposited particles of the powdered substance into the open end of said second conduit means in said tube for recirculation through said conduit means and back to said tube.

2. An apparatus as defined in claim 1, wherein said air feeding means is opened to said second conduit means; said second valve means is provided on said second conduit means; and said supplying means is in communication with said second conduit means between said air feeding means and said blower.

3. An apparatus as defined in claim 1, wherein said air feeding means is opened to said first conduit means.

4. An apparatus as defined in claim 3, wherein said apparatus further comprises an additional blower communicated with said air feeding means, thereby to feed the inflating air rapidly into said tube for inflation thereof.

5. An apparatus as defined in claim 1, further comprising means for cooling the air flowing through said second conduit means.

6. An apparatus as defined in claim 1 wherein said means for directing undeposited particles into said second conduit means comprises a funnel shaped member at one end thereof within said inflation tube.

7. An apparatus as defined in claim 1, wherein said supplying means comprises a storage vessel for said powdered substance, a flexible tube connected to said storage vessel and said first conduit means, and a flexible conveyer screw disposed in said flexible tube.

* * * * *